United States Patent
McConville et al.

(10) Patent No.: US 9,878,565 B1
(45) Date of Patent: Jan. 30, 2018

(54) COOLING CONTROL SYSTEM

(71) Applicant: Xerox Corporation, Norwalk, CT (US)

(72) Inventors: Paul J. McConville, Webster, NY (US); Jason M. Lefevre, Penfield, NY (US); Steven R. Moore, Pittsford, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/384,417

(22) Filed: Dec. 20, 2016

(51) Int. Cl.
| | |
|---|---|
| B41J 29/38 | (2006.01) |
| B41J 29/13 | (2006.01) |
| B41J 29/02 | (2006.01) |
| B41J 2/175 | (2006.01) |
| B41J 29/377 | (2006.01) |
| G05D 23/13 | (2006.01) |
| B41J 2/335 | (2006.01) |
| B41J 2/44 | (2006.01) |
| B41J 2/475 | (2006.01) |
| G02B 7/18 | (2006.01) |

(52) U.S. Cl.
CPC ........... B41J 29/377 (2013.01); B41J 2/3358 (2013.01); B41J 2/442 (2013.01); B41J 2/4753 (2013.01); G02B 7/181 (2013.01); G05D 23/1393 (2013.01)

(58) Field of Classification Search
CPC ........ B41J 2/442; B41J 2/4753; B41J 2/3358; B41J 29/377; G02B 7/181; G05D 23/1393
See application file for complete search history.

(56) References Cited

U.S. PATENT DOCUMENTS

| | | | |
|---|---|---|---|
| 4,310,047 A | 1/1982 | Branson | |
| 4,512,161 A * | 4/1985 | Logan | G05D 23/1393 236/44 R |
| 4,727,554 A | 2/1988 | Watanabe | |
| 4,848,090 A | 7/1989 | Peters | |
| 5,940,271 A | 8/1999 | Mertol | |
| 6,012,291 A | 1/2000 | Ema | |
| 6,523,353 B2 | 2/2003 | Evans et al. | |
| 6,545,332 B2 | 4/2003 | Ruckdeschel | |
| 6,814,445 B2 | 11/2004 | Kalyandurg et al. | |
| 6,816,375 B2 | 11/2004 | Kalyandurg | |
| 7,072,184 B2 | 7/2006 | Kalyandurg | |
| 7,660,124 B2 | 2/2010 | Chen et al. | |
| 2007/0284547 A1* | 12/2007 | Sejersen | B41J 2/442 250/503.1 |
| 2013/0050669 A1 | 2/2013 | Maeda | |
| 2016/0010901 A1* | 1/2016 | Osuman | H01L 35/30 355/30 |

OTHER PUBLICATIONS

U.S. Appl. No. 15/270,607, filed Sep. 20, 2016, Hunter.

* cited by examiner

Primary Examiner — Julian Huffman
(74) Attorney, Agent, or Firm — Kevin Soules; Luis M. Ortiz; Kermit D. Lopez (57) ABSTRACT

A cooling control system and method comprise a power meter for measuring a power of a laser, a temperature controller configured to adjust a temperature of fluid circulating through a cooling block, and a chip connected to the cooling block wherein the temperature controller regulates said temperature of the coolant in order to prevent the chip from overheating or from developing condensation on the chip.

20 Claims, 7 Drawing Sheets

COOLING CONTROL SYSTEM

TECHNICAL FIELD

Embodiments are generally related to the field of printing. Embodiments are also related to methods and systems for transferring heat. Embodiments are additionally related to methods and systems for controlling chip temperature. Embodiments are further related to variable cooling control systems where the coolant temperature is a function of power incident on a DMD chip.

BACKGROUND

Thermochromic print systems use lasers to selectively deliver energy to a target using a Digital Micromirror Device (DMD). The incident energy (usually laser light) activates thermochromic ink that is distributed on the surface of the target. Damage can occur if the DMD chip (and its internal components) exceeds a critical temperature (approximately 70 degrees Celsius).

As a result current technology is limited. A DMD chip in such a print system can only run at 80% power for approximately 20 seconds before reaching a temperature maximum. It would be advantageous to develop a temperature control system that allows the print system to operate at 100% power and at 100% duty-cycle.

One option is to improve cooling technology associated with the print system. However, lowering the temperature of coolants is problematic because lower temperatures result in condensation on the DMD chip. Condensation can foul the chip and/or result in catastrophic damage to the system.

As such, there is a need in the art for systems and methods that provide dynamic control of coolant to print systems as disclosed in the following embodiments.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for controlling chip temperature.

It is another aspect of the disclosed embodiments to provide a control system associated with a banyan printer for adjusting chip heat levels.

It is yet another aspect of the disclosed embodiments to provide an enhanced method and system for variable cooling control systems where the coolant temperature is a function of power incident on a DMD chip.

The aforementioned aspects and other objectives and advantages can now be achieved as described herein. A cooling control system comprises a power meter for measuring a power of a laser, a temperature controller configured to adjust a temperature of fluid circulating through a cooling block, and a chip connected to the cooling block wherein the temperature controller regulates the temperature of the coolant in order to prevent the chip from overheating and to prevent condensation from developing on the chip.

A temperature control method comprises measuring the power of a laser with a power meter, circulating a fluid through a cooling block, and regulating the temperature of the fluid circulating through the cooling block according to the measured power of the laser in order to prevent the DMD chip from overheating and in order to prevent condensation from developing on the chip.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in the following non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
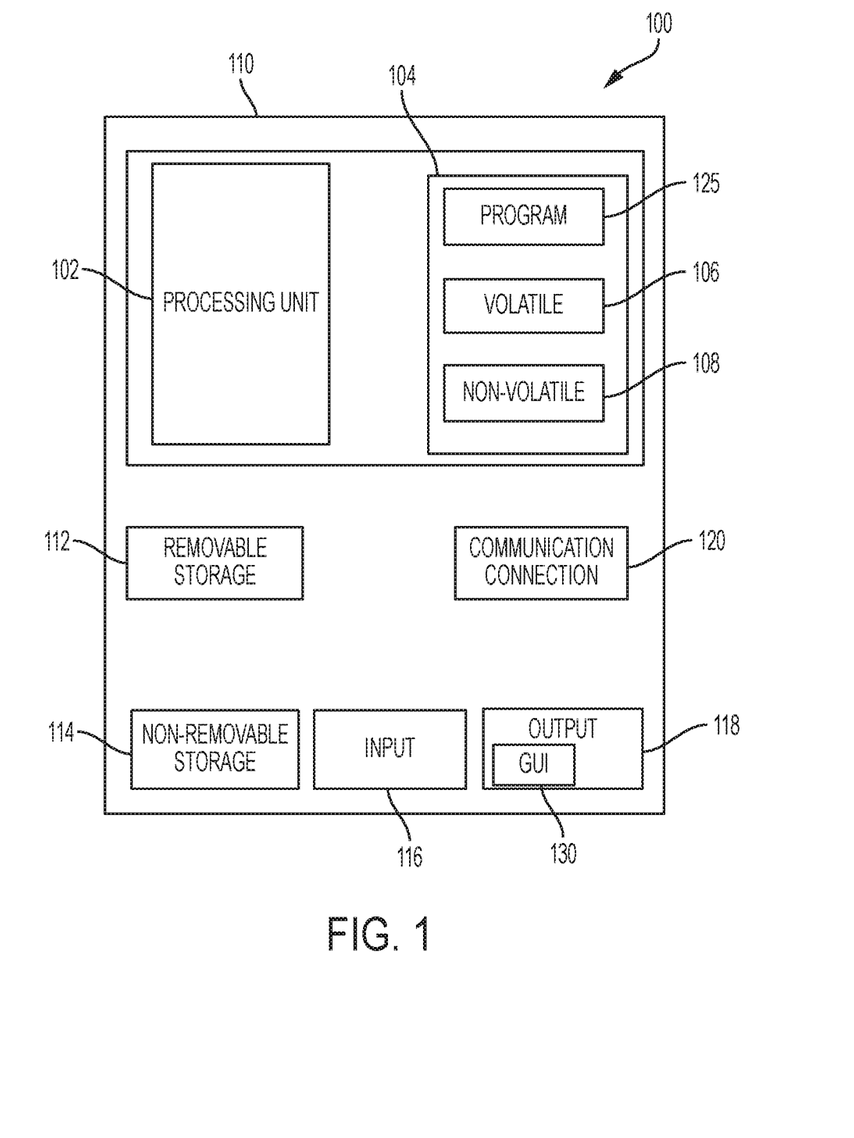
FIG. 1 depicts a block diagram of a computer system which is implemented in accordance with the disclosed embodiments.
Figure 2:
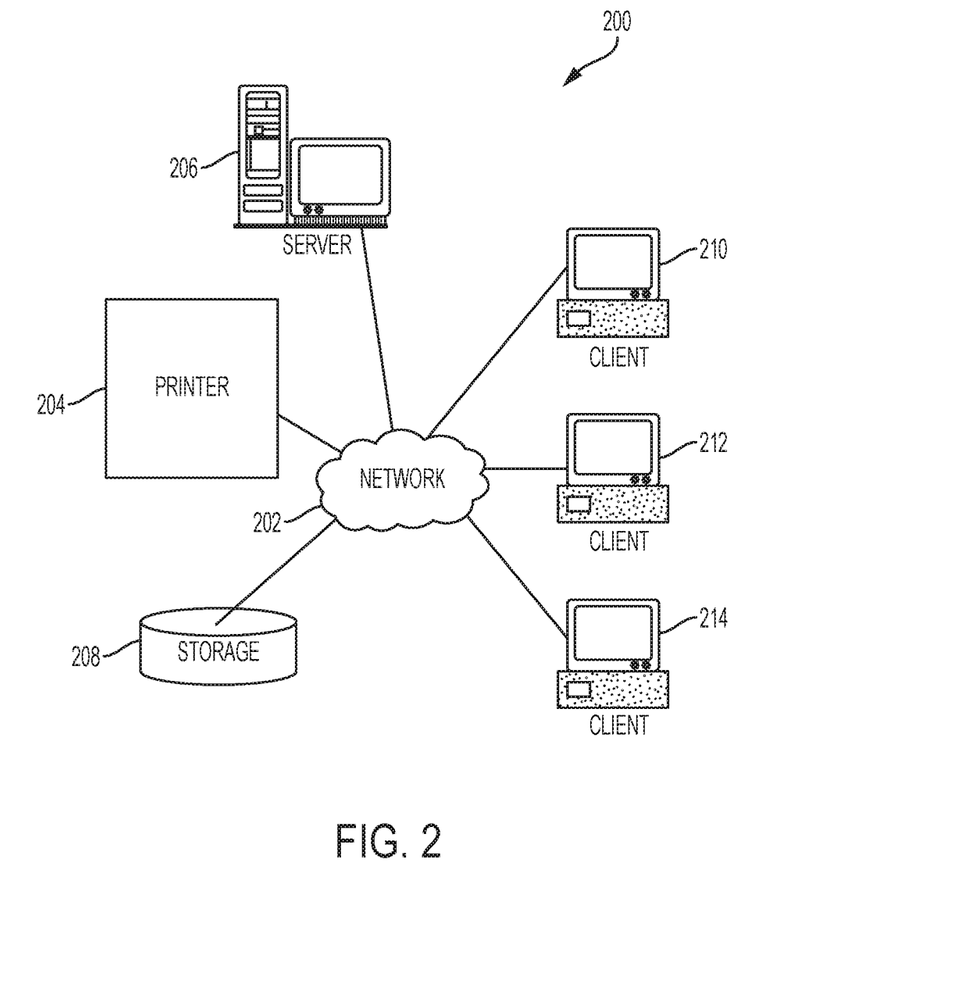
FIG. 2 depicts a graphical representation of a network of data-processing devices in which aspects of the present embodiments may be implemented.
Figure 3:
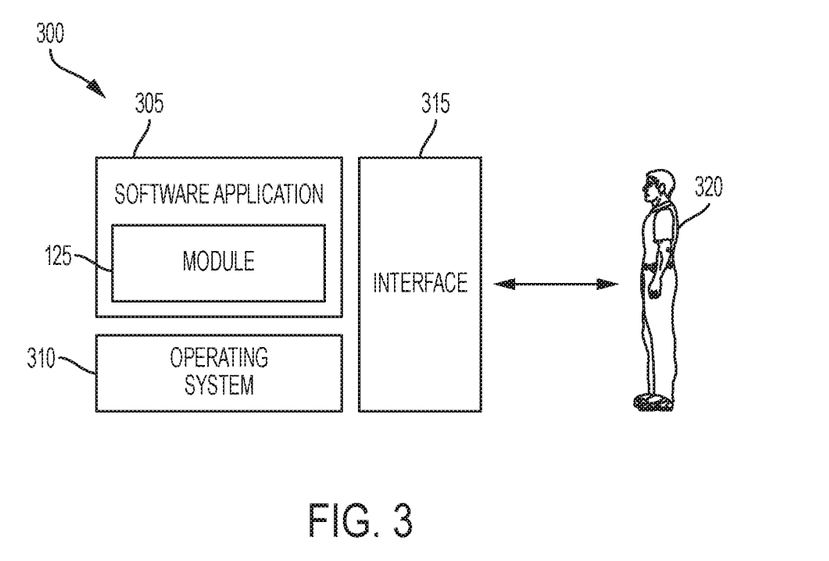
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, camera, accelerometer, gyroscope, multi-function device, printer, tracking device, or the like. In the embodiments disclosed herein, a multi-function device can comprise a printer, print system, fax machine, copy machine, a scanner, or some combination thereof. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices 204 such as a printer, copier, scanner, multifunction device, sensor, actuator, mixer, control module, or the like, and a memory storage unit such as, for example, memory or database 208.

In the depicted example, printer 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a camera, tracking device, sensor, accelerometer, gyroscope, multifunction device, printer, scanner, etc.

Computer system 100 can also be implemented as a server such as server 206, depending upon design considerations. In the depicted example, server 206 provides data such as boot files, operating system images, applications, and application updates to clients 210, 212, and 214, and/or to printer 204. Clients 210, 212, and 214 and printer 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305 may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 4:
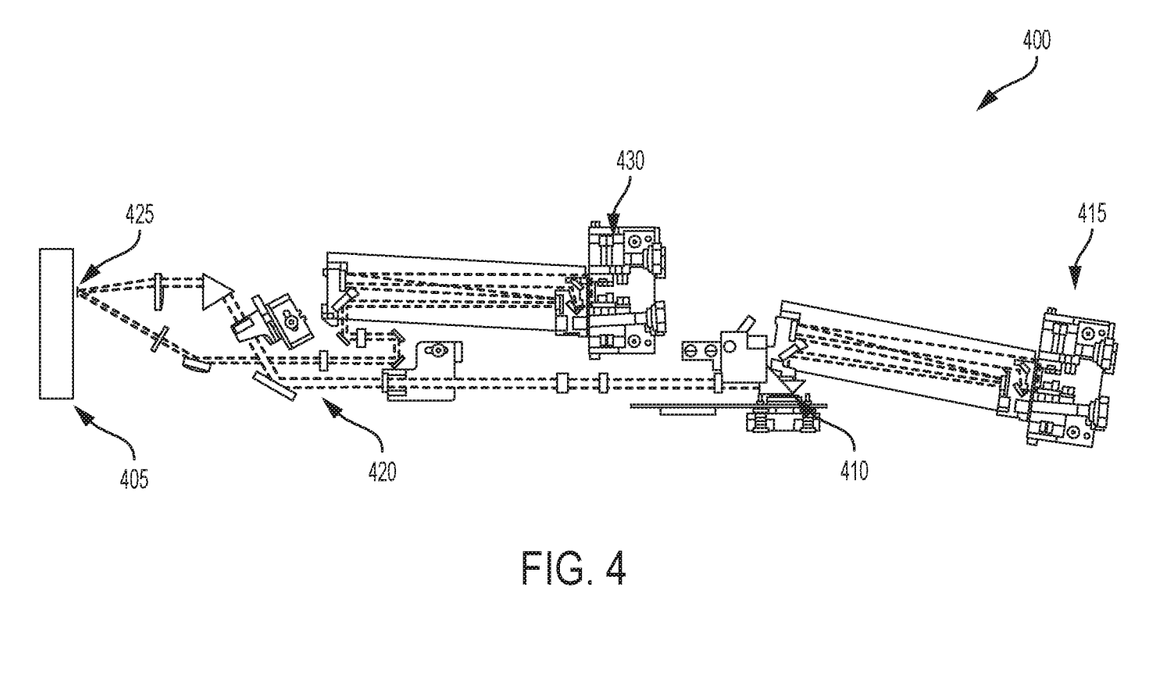
FIG. 4 depicts a block diagram of a print system which is implemented in accordance with the disclosed embodiments.

FIG. 4 illustrates a high-level block diagram of the major components in a printing system 400 in accordance with one embodiment. The media 405 can comprise a blank medium with thermochromic ink on its exterior surface. A DMD mirror array module 410 can direct light from the imaging LDA 415 to an imaging path 420, and eventually onto the media 405 at the image plane 425.

A preheating LDA subsystem consisting of preheating LDA 430 can direct energy to the media 405 which can bring the thermochromic ink to a temperature just below the point at which the thermochromic ink will begin to expose and reveal visible marking.

The laser light provided from the imaging LDA 415 on the DMD mirror array module 410 causes extreme heat increases. The embodiments disclosed herein make use of highly conductive thermal and non-conductive electrical grease and an electrically isolated coolant in a cooling block to conduct heat away from the DMD chip more efficiently.

Figure 5:
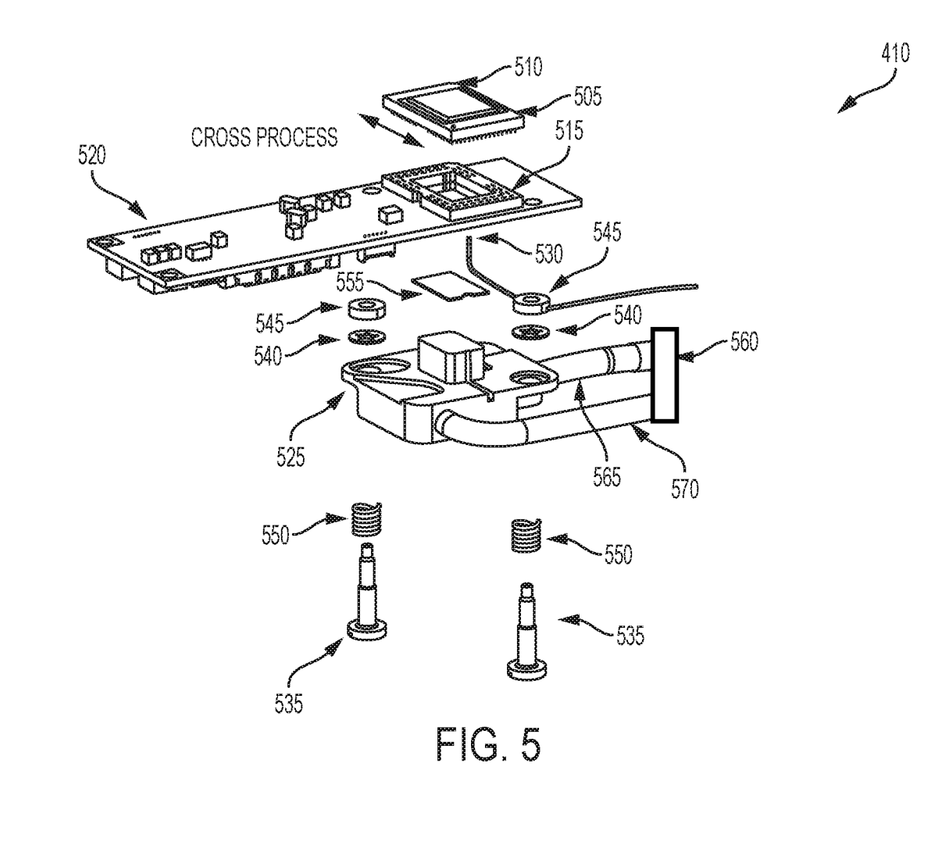
FIG. 5 depicts a block diagram of a DMD chip and cooling block assembly implemented in accordance with the disclosed embodiments.

FIG. 5 illustrates a more detailed diagram of the DMD mirror array module 410 in accordance with the disclosed embodiments. The DMD chip 505 is disposed on a substrate 510. The chip 505 and the substrate 510 can be operably connected to a socket 515 provided on a printed circuit board (PCB) 520. The PCB 520 includes circuitry and/or electronic components that are used to communicate with and control the DMD chip 505. The PCB may be further configured to communicate with and/or receive instructions from a computing device, such as computer system 100.

Below the DMD chip 505 and PCB 510, a cooling block 525 can be configured to transfer heat away from the DMD chip 505. A thermistor 530 can be connected to the DMD chip 505 to measure temperature of the DMD chip 505. Thermistors are generally understood to be resistors where the resistance of the resistor depends on the temperature of the resistor. Thus, the resistance of the thermistor 530 can be correlated to the temperature at the thermistor 530. It should be appreciated that thermistor 530 may alternatively be embodied as other temperature measuring apparatuses, such as a thermometer.

Shoulder screws 535 can run through the cooling block and engage complaint washers 540 and push nuts 545. The shoulder screws 535 are used to hold the cooling block in place against the DMD chip 505/PCB 510. Additional insulated springs 550 can be used to ensure quality contact between the cooling block and DMD chip 505.

Electrical barrier 555 can be applied to the cooling block 525 at the interface between the cooling block 525 and the DMD chip 505. In certain embodiments, the electrical barrier 555 may be embodied as a silicon layer, sheet or substrate, polymers, rubbers, ceramics, plastics, or other similar materials The cooling block 525 is fitted inline with a coolant circulation system 560. The coolant circulation system circulates coolant via inlet 565 into cooling block 525. Heat is transferred to the coolant while it is in the cooling block 525 and then circulated out of the cooling block 525 via outlet 570. Any number of pumps, ducts, manifolds, compressors, refrigerants, or other such equipment may be used in association with the coolant circulation system 560. In certain embodiments, the coolant circulation system 560 may comprise a pump, refrigerator, heat pump, chiller, or other such system. In certain embodiments, the coolant may comprise antifreeze (e.g., ethylene glycol, diethylene glycol, or propylene glycol), Oils (Mineral oils, cutting oils, silicone oils), Refrigerants (R-12, R-22, R-134a), or the like.

Figure 6:
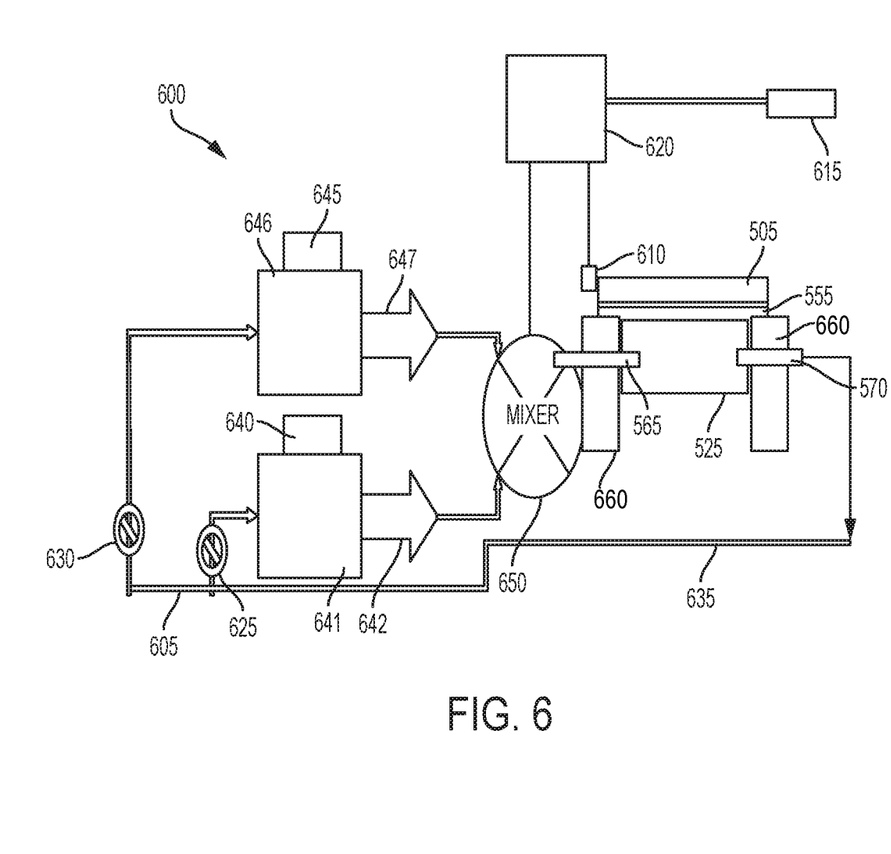
FIG. 6 depicts a system for dynamically controlling the temperature of a chip in accordance with the disclosed embodiments.

FIG. 6 illustrates an additional embodiment of a system 600 for regulating the temperature of a DMD or DLP chip 505. The system can be characterized as a variable cooling control system 600. In an embodiment, the temperature of coolant 605 can be determined according to the laser power incident on the DMD chip 505. The incident laser power can be determined with power meter 615. Note that the laser power may also be determined as a function of input voltage to the LDA 415. Alternatively or additionally, a thermistor 610 or thermometer can be employed so that the temperature of the coolant 605 is determined according to the temperature of the DMD chip and/or the power of the laser.

The system can include a controller 620 that is provided temperature information from thermistor 610 or power information from power meter 615. The controller 620 can also receive information related to laser power, LDA voltage, or DMD chip temperature. It should be appreciated that in some embodiments the controller 620 can comprise a computer or computing device connected to various other components as illustrated in FIGS. 1-3. The computing device can be configured to accept and process electronic data, and then send instructions as electronic data, for example, to mixer 650. In other embodiments, the controller may comprise a mechanical or electromechanical apparatus configured to accept voltages and adjust valve openings associated with mixer 650.

The system may also include one or more pumps 625 and 630 which serve to move coolant 605 through conduit 635 completing a fluidic circuit between inlet 565 and outlet 570.

The system 600 can further comprise a coolant cooler 640 and a coolant heater 645. Coolant cooler 640 can comprise a refrigerator, heat pump, chiller, or other such system along with a tank 641 for storing cooled coolant 642. Coolant heater 645 may comprise a boiler, furnace, heater, or other such device and a tank 646 for storing the heated coolant 647.

The coolant cooler 640 and coolant heater 645 are connected to a mixer 650. The mixer 650 can comprise a mixing valve and/or mixing tank. The mixer is controlled by controller 620, which regulates the relative proportions of heated coolant 647 and cooled coolant 642 combined by the mixer to achieve the desired coolant temperature.

Temperature changes on the DMD 505 surface can occur quickly and often. Incident laser light can cause the DMD chip 505 temperature to exceed its operating threshold in a matter of seconds. In order to transfer heat away from the DMD chip 505, coolant 605 can be circulated through the cooling block 525. However, when the incident laser light is stopped, the DMD chip temperature can decrease rapidly. The coolant 605 being supplied to the cooling block 525 to reduce the temperature exacerbates the temperature change.

In particular, if a shut off condition requires immediate shut down of the LDA 415, the temperature of the DMD chip 505 can decrease rapidly. As water vapor in the air comes into contact with the rapidly cooling exterior surface of the DMD chip 505, the gaseous water vapor turns into water droplets that can foul or damage the DMD chip.

Accordingly, when the power of the LDA 415 changes, a correspondingly rapid change in the temperature of the coolant 605 is necessary to prevent the DMD chip 505 from overheating (in the case of power increase), and to prevent the formation of condensation on the DMD chip 505 (in the case of power decrease). The controller 620 can thus monitor the laser power of the LDA 415 and adjust the mixer 650 to provide coolant 605 from the cooler 640 and the heater 645 in the proper proportion to yield the desired temperature coolant 605 to the cooling block 525.

It should be understood that the cooling block 525 includes a manifold and heat sink configured to transfer heat energy to and from the DMD chip 505. In order to ensure the temperature of the coolant is correct, the controller 620 can receive frequent power readings, for example, at 60 hertz, or other rate, from the power meter 615 and/or thermistor 530.

It is important to note that the system 600 is configured to react rapidly to changes in the DMD chip 505 temperature or LDA 415 power. To this end in one embodiment, the tank 641 associated with the coolant cooler 640 can be maintained at a specific temperature. The temperature of the coolant 642 in the coolant cooler tank 641 can be pre-determined according to the temperature necessary to maintain the DMD chip 505 at the desired level during exposure to 100% power from the laser. In an embodiment, this temperature can be 0 degrees Celsius, but other tank temperatures may be chosen according to design considerations.

Likewise, the coolant heater 645 can maintain coolant 647 in the heater tank 646 at a pre-determined temperature. The temperature of the coolant 647 in the heater tank 646 can be pre-determined according to the temperature necessary to prevent condensation from forming on the DMD chip 505. In an embodiment, that temperature can be 20 degrees Celsius, but other tank temperatures may be chosen according to design considerations.

The interface between the cooling block 525 and the DMD chip 505 can include an electrical barrier 555 to prevent the chip from grounding though the cooling block 525 and coolant 605. Insulation 660 can surround cooling block 525 to prevent environmental conditions from affecting the heat transfer between the cooling block 525 and DMD chip 505. The conduit 635 and other interfaces in the system may be similarly insulated.

In the event that the laser power is at 100% capacity, the controller 620 can shutoff coolant flow from the heater 645 and heat tank 646 at the mixer 650. If the laser power is suddenly halted, for example, because of a shut off condition, the controller 620 can immediately shut off flow from the cooler 640 and cooler tank 641 and fully open flow from the heater 645 and heat tank 646. This allows warm coolant 647 to flow to the cooling block 525 in order to maintain the temperature of the DMD chip 505 above the temperature where condensation will form on the DMD chip 505. Upon reengagement of the laser, the controller 620 can dynamically adjust the flow of heated and cooled coolant from the mixer 650. The adjustment can be directly related to the power level being reported by the power meter.

In an embodiment, a pre-defined relationship between power level and coolant temperature can be established. The controller can use this relationship to adjust the amount of heated coolant 647 and cooled coolant 642 to achieve the desired temperature of coolant 605 exiting the mixer 650. The coolant 605 that subsequently cycles through cooling block 525 can be re-circulated to one or more valves that directed some volume of the coolant 605 to cooler 640 and some volume of the coolant 605 to heater 645.

In other embodiments, the controller 620 can be either independently or additionally connected to a thermometer or thermistor 610 monitoring the temperature of the DMD chip 505. In such embodiments, the temperature reading from the chip 505 can be used in a manner similar to the power recorded from the power meter 615 as a reference for determining the desired temperature of the coolant 605 flowing through the cooling block 525. This may include a maximum allowable temperature and a minimum allowable temperature of the DMD chip 505 with corresponding (and likely different) coolant temperatures held in the cooling tank 641 and heating tank 646, respectively.

In other embodiments, the controller 620 can be embodied as a mechanical device such as a mechanical thermostat. As the temperature or power reading changes, the mechanical device can be calibrated to open or close mixing valves in the mixer 650 to achieve the desired temperature of coolant 605.

Figure 7:
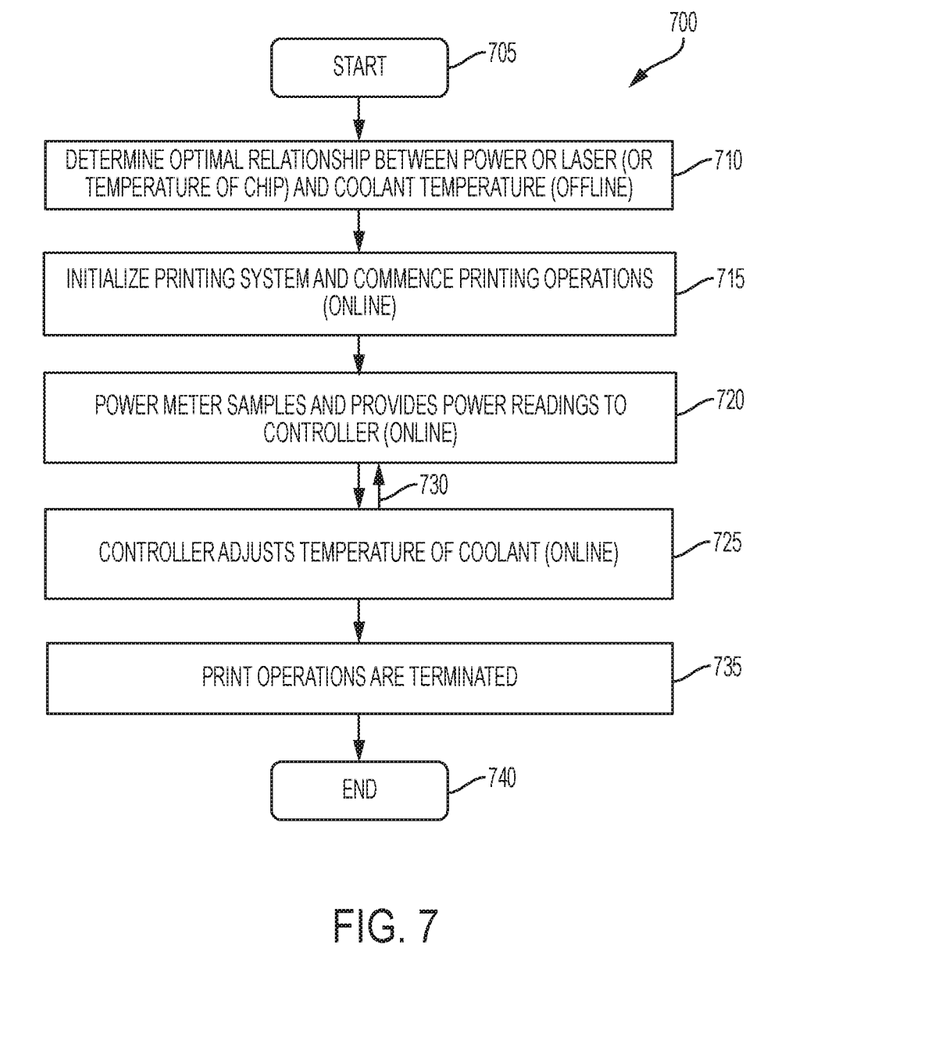
FIG. 7 depicts a flow chart illustrating steps associated with a method for controlling the temperature of a chip in accordance with the disclosed embodiments.

FIG. 7 illustrates a flow chart associated with a method 700 for dynamically controlling the temperature of a chip in accordance with the embodiments disclosed herein. The method begins at block 705.

First in an offline stage at block 710, an algorithm defining coolant temperature as a function of laser power, or coolant temperature as a function of chip temperature, can be defined and provided to a controller 620. The relationship can serve as the logic control for the system 600. Next in an online stage, a thermochromic laser print system can be initialized and being rendering documents as shown at block 715. A power meter can monitor the power level of the laser and provide the power level to a controller as illustrated at block 720. In other embodiments, a temperature sensor or thermistor may be used instead of, or in addition to, the power meter. At block 725, the controller can use the power reading (or temperature reading) to dynamically adjust the temperature of coolant entering the cooling block according to the relationship established at block 710.

In some cases, at block 725, the controller may completely stop flow of cooled coolant in order to provide heated coolant to the cooling block to prevent the formation of condensation on the DMD chip. In other circumstances, the controller may complete stop the flow of heated coolant when the laser power is at 100% capacity.

As arrow 730 illustrates, the online stage of the method is iterative. The power meter can sample and report a power reading at a preferred rate, for example, 60 hertz or other desirable sampling rate. Upon each sampling, blocks 720 and 725 are repeated until the printing system is deactivated as shown at block 735. The method ends at block 740.

In sum, the embodiments herein provide a variable cooling control system where the coolant temperature is tied to the laser power incident on the DMD chip. The external lines and interfaces can be well insulated so the vast majority of heat transfer is localized to and between the DMD chip and cooling block. To manage the condensation in and on the chip, as the laser power is turned on and ramped up, the coolant temperature is reduced to enable full power incident on the DMD chip. If the laser is turned off suddenly, the control system similarly reacts quickly by heating the cooling block so no condensation occurs.

The embodiments can comprise a dual temperature system where one reservoir is maintained at a temperature well above the dew point temperature and the second reservoir is held at a low temperature that enables full laser power. In other embodiments, systems such as commercial instant on hot water heaters can be employed to supply a fast coolant temperature increase in case of sudden shut down of the laser. The control schemes can also use temperature sensors on or near the DMD as feedback control for coolant temperature.

Based on the foregoing, it can be appreciated that a number of embodiments, preferred and alternative, are disclosed herein. For example, in an embodiment, a cooling control system comprises a power meter for measuring a power of a laser, a temperature controller configured to adjust a temperature of fluid circulating through a cooling block, and a chip connected to the cooling block wherein the temperature controller regulates the temperature of the coolant in order to prevent the chip from overheating and in order to prevent condensation from developing on the chip.

In an embodiment, the system further comprises a heat tank filled with heated fluid, a cooling tank filled with cooled fluid, and a mixer configured to mix the heated fluid and the cooled fluid. In an embodiment, the temperature controller comprises a processor, a data bus coupled to the processor, and a computer-usable medium embodying computer program code, the computer-usable medium being coupled to the data bus, the computer program code comprising instructions executable by the processor and configured for: monitoring the power of the laser, and controlling the mixer to provide a mixture of the cooled fluid and the heated fluid according to the power of the laser.

In an embodiment, the cooling block further comprises a manifold for accepting transmission of the mixed heated fluid and cooled fluid. In an embodiment, the heated fluid and the cooled fluid further comprises a thermoconducting fluid.

In another embodiment, the chip comprises a digital micromirror device chip and the laser and the chip are associated with a printing system.

In another embodiment, a temperature control method comprises measuring the power of a laser with a power meter, circulating a fluid through a cooling block, and regulating a temperature of the fluid circulating through the cooling block according to the measured power of the laser in order to prevent a chip from overheating and in order to prevent condensation from developing on the chip.

In an embodiment, the method further comprises heating the fluid in a heat tank with a heating element, cooling the fluid in a cooling tank with a cooling element, and mixing the heated fluid and the cooled fluid with a mixer.

In an embodiment of the method, the temperature controller comprises a processor, a data bus coupled to the processor, and a computer-usable medium embodying computer program code, the computer-usable medium being coupled to the data bus, the computer program code comprising instructions executable by the processor and configured for: monitoring the power of the laser; and controlling the mixer to provide a mixture of the cooled fluid and the heated fluid according to the power of the laser.

In an embodiment, the cooling block further comprises a manifold for accepting transmission of the mixed heated fluid and cooled fluid. In an embodiment, the heated fluid and the cooled fluid further comprise a thermoconducting fluid.

In an embodiment, the method comprises connecting the cooling block to the chip. In another embodiment, the laser and the chip are associated with a printing system.

In yet another embodiment, a cooling control apparatus comprises a thermochromic printer comprising a laser and a DMD chip, a power meter for measuring a power of the laser, a temperature controller configured to adjust a temperature of fluid, and a cooling block connected to the DMD chip wherein the temperature controller regulates the temperature of the fluid in order to prevent the chip from overheating and in order to prevent condensation from developing on the chip.

In an embodiment, the apparatus further comprises a heat tank and a heating element configured to heat the fluid, a cooling tank and a cooling element configured to cool the fluid, and a mixer configured to mix the heated fluid and the cooled fluid.

In an embodiment, the temperature controller comprises a processor, a data bus coupled to the processor, and a computer-usable medium embodying computer program code, the computer-usable medium being coupled to the data bus, the computer program code comprising instructions executable by the processor and configured for: monitoring the power of the laser; and controlling the mixer to provide a mixture of the cooled fluid and the heated fluid according to the power of the laser.

In an embodiment, the cooling block further comprises a manifold for accepting transmission of the mixed heated fluid and cooled fluid and the heated fluid and the cooled fluid further comprise a thermoconducting fluid.

In another embodiment, the apparatus further comprises an insulator covering the exterior of the cooling block.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A cooling control system comprising:
   a power meter for measuring a power of a laser;
   a heat tank filled with heated fluid and a cooling tank filled with a cooled fluid;
   a temperature controller configured to adjust an amount of heated fluid provided from said heat tank and an amount of cooled fluid provided from said cooling tank in order to adjust a temperature of a combined fluid circulating through a cooling block according to said measured power of said laser; and
   a chip connected to said cooling block wherein said temperature controller regulates said temperature of said combined fluid according to said measured power of said laser, in order to prevent said chip from overheating and in order to prevent condensation from developing on said chip.

2. The system of claim 1 further comprising:
   a mixer configured to mix said heated fluid and said cooled fluid.

3. The system of claim 2 wherein said temperature controller comprises:
   a processor;
   a data bus coupled to said processor; and
   a computer-usable medium embodying computer program code, said computer-usable medium being coupled to said data bus, said computer program code comprising instructions executable by said processor and configured for:
   monitoring said power of said laser; and
   controlling said mixer to provide a mixture of said cooled fluid and said heated fluid according to said power of said laser.

4. The system of claim 2 wherein said cooling block further comprises:
   a manifold for accepting transmission of said mixed heated fluid and cooled fluid.

5. The system of claim 2 wherein said heated fluid and said cooled fluid further comprises a thermoconducting fluid.

6. The system of claim 1 wherein said chip comprises a digital micromirror device chip.

7. The system of claim 1 wherein said laser and said chip are associated with a printing system.

8. The method of claim 1 further comprising:
   connecting said cooling block to said chip.

9. A temperature control method comprising:
   measuring the power of a laser with a power meter;
   heating said fluid in a heat tank with a heating element;
   cooling said fluid in a cooling tank with a cooling element;
   circulating a combination of said heated fluid and said cooled fluid through a cooling block; end
   regulating a temperature of said fluid circulating through said cooling block by adjusting an amount of said heated fluid and an amount of said cooled fluid according to said measured power of said laser in order to prevent a chip from overheating and in order to prevent condensation from developing on said chip.

10. The method of claim 9 further comprising:
    mixing said heated fluid and said cooled fluid with a mixer.

11. The method of claim 10 wherein said temperature controller comprises:
    a processor;
    a data bus coupled to said processor; and
    a computer-usable medium embodying computer program code, said computer-usable medium being coupled to said data bus, said computer program code comprising instructions executable by said processor and configured for:
    monitoring said power of said laser; and
    controlling said mixer to provide a mixture of said cooled fluid and said heated fluid according to said power of said laser.

12. The method of claim 10 wherein said cooling block further comprises:
    a channel for accepting transmission of said mixed heated fluid and cooled fluid.

13. The method of claim 10 wherein said heated fluid and said cooled fluid further comprises a thermoconducting fluid.

14. The method of claim 9 wherein said laser and said chip are associated with a printing system.

15. A cooling control apparatus comprising:
    a thermochromic printer comprising a laser and a DMD chip;
    a power meter for measuring a power of said laser;
    a temperature controller configured to adjust an amount of heated fluid provided from a heat tank and an amount of cooled fluid from a cooling tank in order to adjust a temperature of a combined fluid according to said measured power of said laser; and a cooling block connected to said DMD chip wherein said temperature controller regulates said temperature of said fluid according to said measured power of said laser in order to prevent said chip from overheating and in order to prevent condensation from developing on said chip.

16. The apparatus of claim 15 further comprising:

a mixer configured to mix said heated fluid and said cooled fluid.

17. The apparatus of claim 16 wherein said temperature controller comprises:

a processor;

a data bus coupled to said processor; and a computer-usable medium embodying computer program code, said computer-usable medium being coupled to said data bus, said computer program code comprising instructions executable by said processor and configured for:

monitoring said power of said laser; and controlling said mixer to provide a mixture of said cooled fluid and said heated fluid according to said power of said laser.

18. The apparatus of claim 16 wherein said cooling block further comprises:

a manifold for accepting transmission of said mixed heated fluid and cooled fluid.

19. The apparatus of claim 16 wherein said heated fluid and said cooled fluid further comprises a thermoconducting fluid.

20. The apparatus of claim 16 further comprising an insulator covering the exterior of said cooling block.

* * * * *